United States Patent [19]

Kroiss et al.

[11] Patent Number: 5,197,759
[45] Date of Patent: Mar. 30, 1993

[54] AIR BAG COLLISION SAFETY DEVICE

[76] Inventors: Alfred Kroiss, Eichenstrasse 15a; Heinz Methfessel, Eichenstrasse 31, both of 8059 Wartenberg, Fed. Rep. of Germany

[21] Appl. No.: 682,184

[22] Filed: Apr. 8, 1991

[30] Foreign Application Priority Data

Apr. 9, 1990 [DE] Fed. Rep. of Germany ....... 4011493
Sep. 10, 1990 [DE] Fed. Rep. of Germany ....... 4028715

[51] Int. Cl.$^5$ .................... B60R 21/26; B60R 21/28
[52] U.S. Cl. .................................. 280/736; 280/739; 280/741; 280/742
[58] Field of Search ............... 280/728, 736, 737, 739, 280/734, 735, 741, 742; 137/68.2, 541

[56] References Cited

U.S. PATENT DOCUMENTS

| | | |
|---|---|---|
| 2,834,609 | 5/1958 | Bertrand . |
| 3,172,684 | 3/1965 | Issac . |
| 3,451,693 | 6/1969 | Carey . |
| 3,481,625 | 12/1969 | Chute . |
| 3,747,953 | 7/1973 | Goes et al. .................... 280/739 |
| 3,861,712 | 1/1975 | Matsui et al. ................ 280/739 X |
| 3,884,499 | 5/1975 | Oka et al. . |
| 3,901,530 | 8/1975 | Radke .......................... 280/736 |
| 4,097,065 | 6/1978 | Okada et al. . |
| 4,116,466 | 9/1978 | Gehrig ......................... 280/736 |
| 4,200,615 | 4/1980 | Hamilton et al. ............ 280/736 X |
| 4,278,638 | 7/1981 | Nilsson et al. .............. 280/736 X |
| 4,294,281 | 10/1981 | Gerdes ......................... 137/541 |
| 4,388,940 | 6/1983 | Powell ......................... 137/541 X |
| 4,964,652 | 10/1990 | Karlow ........................ 280/739 X |
| 5,000,479 | 3/1991 | Werner et al. ................ 280/736 |
| 5,007,662 | 4/1991 | Abramczyk et al. ......... 280/739 |
| 5,060,974 | 10/1991 | Hamilton et al. ........... 280/741 X |

FOREIGN PATENT DOCUMENTS

| | | |
|---|---|---|
| 416835 | 3/1991 | European Pat. Off. . |
| 2056101 | 5/1972 | Fed. Rep. of Germany . |
| 2152902 | 4/1973 | Fed. Rep. of Germany . |
| 2516185 | 10/1975 | Fed. Rep. of Germany . |
| 2915202 | 10/1980 | Fed. Rep. of Germany . |
| 3150297 | 3/1983 | Fed. Rep. of Germany . |
| 3235176 | 3/1984 | Fed. Rep. of Germany . |
| 3644554 | 4/1988 | Fed. Rep. of Germany . |

Primary Examiner—Joseph E. Valenza
Assistant Examiner—Dean A. Reichard
Attorney, Agent, or Firm—Dilworth & Barrese

[57] ABSTRACT

An air bag collision safety device (air bag) for the occupants of a vehicle has an air bag (3) being inflatable by means of a compressed gas source (1, 2). In order to render possible a soft immersion of the body in the air bag (3), between the air bag interior (51) and the ambiance (52) an outlet valve (53) is arranged which is opened when a predetermined pressure difference between the air bag interior (51) and the ambiance (52) is exceeded (FIG. 1).

23 Claims, 5 Drawing Sheets

AIR BAG COLLISION SAFETY DEVICE

BACKGROUND OF THE INVENTION

1. Field of the Invention

This invention refers to an air bag collision safety device (air bag) for the occupants of a vehicle with an air bag being inflatable by means of a compressed gas source. Said compressed gas source can be a gas pressure cartridge, a gas producer cartridge or the like.

2. Description of Prior Art

An air bag of this kind is already known for instance from the German patent publications 36 44 554, 32 35 176 or 21 52 902.

In the solutions mentioned above, the air bag is inflated in case of a collision. Then it remains in this inflated state. If the gas contained in the air bag cannot be discharged, the immersion of the body in the air bag due to an accident is relatively hard.

A further problem consists in the fact to, on the one hand, inflate the air bag as quick as possible and, on the other hand, to not overstretch and destroy it thereby as a result of the quick inflation. For this purpose it has already been known to fire two propellant charges with a time delay, i.e. to inflate the air bag in a distance of time of e.g. 15 millisec. at first partially and then completely. The use of two compressed gas sources which must be opened in an exactly defined distance of time, requires an enormous expenditure.

SUMMARY OF THE INVENTION

It is an object of the present invention to render possible a soft immersion of the body into the air bag.

It is a further object of the invention to simplify an air bag with a still quick and reliable inflation.

This problem is solved according to the invention by an outlet valve being arranged between the air bag interior and the ambiance, said outlet valve opening when a predetermined pressure difference between the air bag interior and the ambiance is exceeded. The pressure difference required for the opening of the outlet valve is determined such that it is exceeded when the body immerses in the air bag. Through the outlet valve, a predeterminable amount of gas can escape, thereby rendering possible a soft immersion of the body in the air bag.

A further advantage obtainable with the invention is the fact that the air bag also shows a reliable effect in case of several subsequent collisions. It has already been known to provide a gas passage in the air bag, which permits that the air bag is completely inflated once but which then immediately allows the gas to escape from the air bag so that the air bag collapses and is no longer available for a further collision. According to the solution of the invention, during the first immersion of the body in the air bag the outlet valve is opened. As soon as the first immersion is terminated, the outlet valve is closed, and the gas in the air bag at this point of time remains therein so that it is available for a possible subsequent collision for the protection of the body. Also in this subsequent collision, the outlet valve opens during the immersion of the body so that also during the second and possible further collisions a soft immersion of the body in the air bag is rendered possible. With respect thereto, in the preknown gas passage the gas only remained in the air bag for about 40 to 50 millisec.. After expiration of this period of time, the air bag was ineffective. The period of time of 40 to 50 millisec., however, is not enough to cover several subsequent collisions. According to the solution of the invention, only that amount of gas escapes the air bag which is displaced by the respective immersion in the air bag in order to enable a soft immersion.

A further advantage to be achieved by the invention is the fact that also at high outside temperatures a destruction of the air bag is prevented. At relatively high outside temperatures, more gas is supplied to the air bag. This results in the risk that the air bag may be destroyed or torn. By the outlet valve provided according to the invention, the destruction of the air bag is avoided. The gas additionally supplied to the air bag due to the increased outside temperatures can be discharged therefrom through the outlet valve.

By the solution according to the invention it is rendered possible that no longer two compressed gas sources must be fired in the defined distance of time from each other, but that the air bag can also be inflated quickly and reliably by a single compressed gas source; however, there can still be used two compressed gas sources, which are fired at a distance of time. The outlet valve produces the effect that after a certain period of time the pressure in the air bag can be reduced. Said period of time can be predetermined. It is for instance possible to open the outlet valve after 10 to 15 millisec. (the smaller the air bag volume, the shorter the given period of time should be chosen). By the relief effected by means of the outlet valve, a destruction of the air bag is avoided. Nonetheless, the air bag is quickly and completely inflated.

Advantageous embodiments of the invention are described in the subclaims.

The given pressure difference preferably is 1 bar. At an ambient pressure of approximately 1 bar, this corresponds to a pressure of 2 bar in the air bag. When the given difference pressure is too low, there is the risk that during the immersion too much gas escapes so that for the subsequent collisions there is no longer a sufficient amount of gas. When the given pressure difference is chosen too large, the damping effect during immersion of the body in the air bag may be too low. Consequently, when determining the pressure difference for the outlet valve, a compromise must be found between the pressure loss or gas loss on the one hand and the dampening effect during immersion on the other hand.

It is advantageous when at first the outlet valve is completely closed and only activated after actuation of the compressed gas source, preferably after a predetermined period of time after actuation of the compressed gas source. When the outlet valve is at first completely closed, first of all after actuation of the compressed gas source the air bag can be completely inflated undisturbed. During this time the outlet valve is still not activated, i.e. it acts like a closed wall. The result thereof is that the given difference pressure is infinitely large. However, it can also be sufficient, if the given difference pressure is very large.

Only after actuation of the compressed gas source, the outlet valve is activated. When activated, the valve can operate as an outlet valve with a given pressure difference. Said activation is preferably carried out after a predetermined period of time following the actuation of the compressed gas source. Said period of time is chosen such that on the one hand there is sufficient time for a complete and undisturbed inflation of the air bag and, on the other hand, for an activation of the outlet valve as early as possible in order to enable a soft immersion of the body as soon as possible.

The outlet valve is preferably activated 30 millisec. after the actuation of the compressed gas source. Generally, 30 millisec. are sufficient for completely inflating the air bag.

According to a further advantageous development, the outlet valve is activated 10 to 15 millisec. after the actuation of the compressed gas source. After this period of time, the air bag has not yet been completely inflated. If only a single compressed gas source is used, and if the air bag is to be filled thereby quick enough, within a very short time a very high pressure is built up in the air bag which can result in an overstretching and in a destruction of the air bag material. If, however, the outlet valve is opened after 10 to 15 millisec., there is a pressure relief which prevents a destruction of the air bag, but it is nevertheless possible that the air bag is completely inflated by only one compressed gas source quickly enough without destruction.

According to an advantageous further development, two compressed gas sources are provided, the second compressed gas source being activated at a predetermined period of time of preferably 15 millisec. after the first compressed gas source. By the timely delayed actuation of two compressed gas sources, an especially quick and reliable inflation of the air bag is rendered possible without endangering the air bag or the air bag material, as is for instance described in the German laid-open print 31 50 297; however, the expenditure for the realization thereof is larger.

The outlet valve can be activated through a pyrotechnical triggering mechanism.

The outlet valve is preferably provided with a casing in which a valve rocker carrying a valve plate is guided for longitudinal movement thereof.

It is advantageous to provide the outlet valve with a closing plate at its side facing the air bag interior, said closing plate being preferably removable and/or destructible by a pin which is preferably drivable by a propellant. At first the closing plate is exclusively acting which effects a complete sealing of the outlet valve with respect to the air bag interior. After actuation of the compressed gas source the closing plate is removed or destroyed so that from this point of time on the outlet valve is activated. The pin removing or destroying the closing plate can be drivable by an electrically actuatable propellant. The compressed gas source is preferably constituted by a casing with an annulus. The annulus is preferably welded in an annular form on both sides. A center insert can be welded to the casing. It is advantageous to connect, preferably weld a closing plate (bursting disk) to the insert.

The casing can be disk-shaped. When the cross-section of the annulus, being preferably elliptic or like an ellipse, is smaller in the radial direction than in the axial direction, in case of a failure of the disk-like casing the occupant of the vehicle is protected. The disk-shaped casing is then destroyed in a radial direction so that parts being blown off do not endanger occupants of the vehicle sitting in axial direction in front of the casing.

Embodiments of the invention will now be described in the following with reference to the drawings.

DETAILED DESCRIPTION OF PREFERRED EMBODIMENTS

Figure 1:
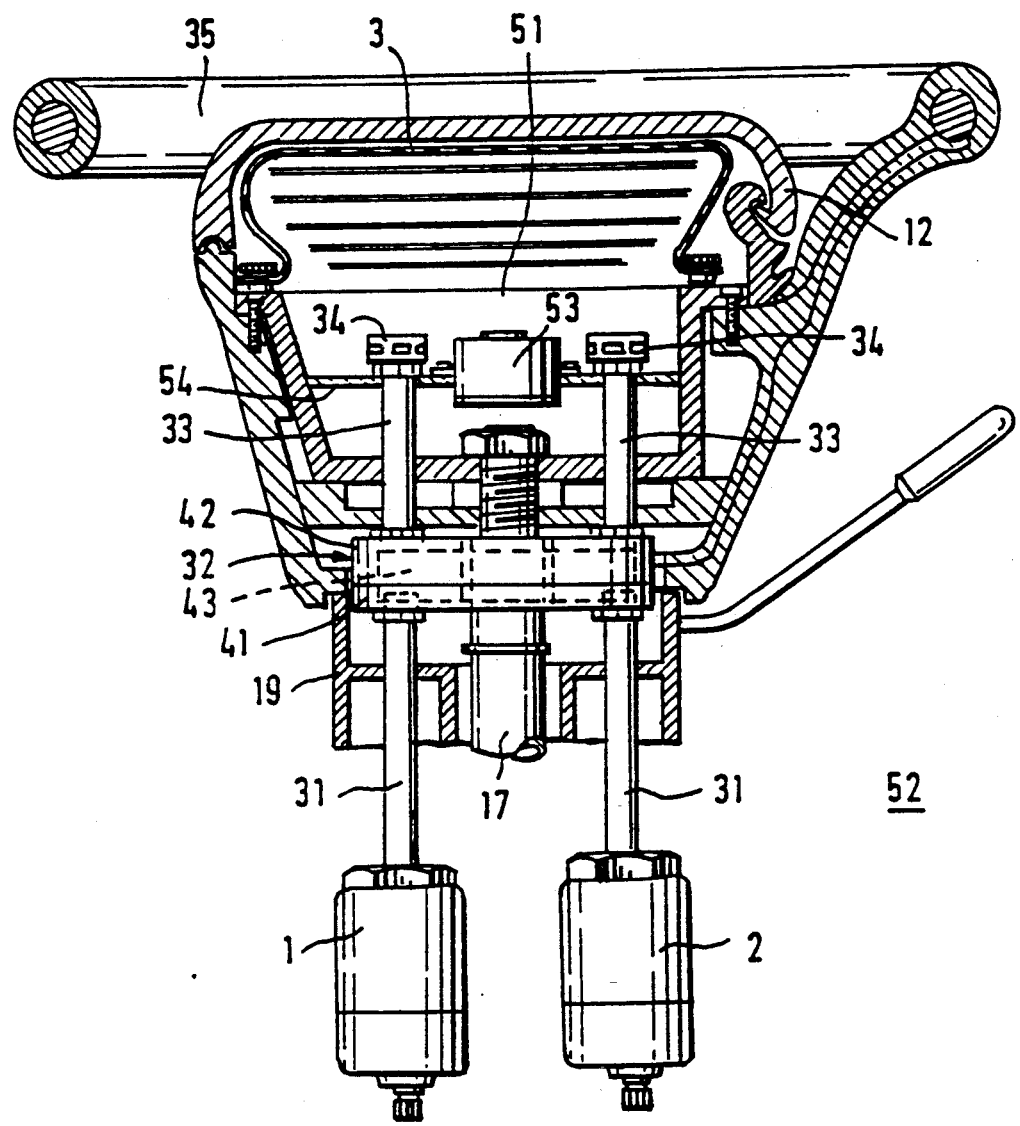
FIG. 1 shows a sectional view of a steering wheel with an air bag.

The vehicle air bag shown in FIG. 1 has gas pressure cylinders 1, 2 which are connected with the gas distributor 32 via the passages 31. From the other end of the gas distributor 32 passages 33 lead to the distributor nozzles 34. In the steering wheel 35 the folded air bag 3 is arranged below the tearing-open pad 12. For a co-driver air bag, the air bag is arranged behind a tearing-open pad in the instrument panel covering at the height at which otherwise the glove compartment is usually to be found. Additional lateral air bags can be provided in the doors.

If in case of an accident danger is indicated for the occupants of the vehicle, for instance by deformation of the car body, the compressed gas sources 1, 2 are fired subsequently with a time delay of 15 millisec.. From the compressed gas sources 1, 2, the compressed gas is supplied via the passages 31 and the gas distributor 32 as well as through the pressure lines 33 and the nozzles 34 to the air bag which is inflated thereby.

Figure 2:
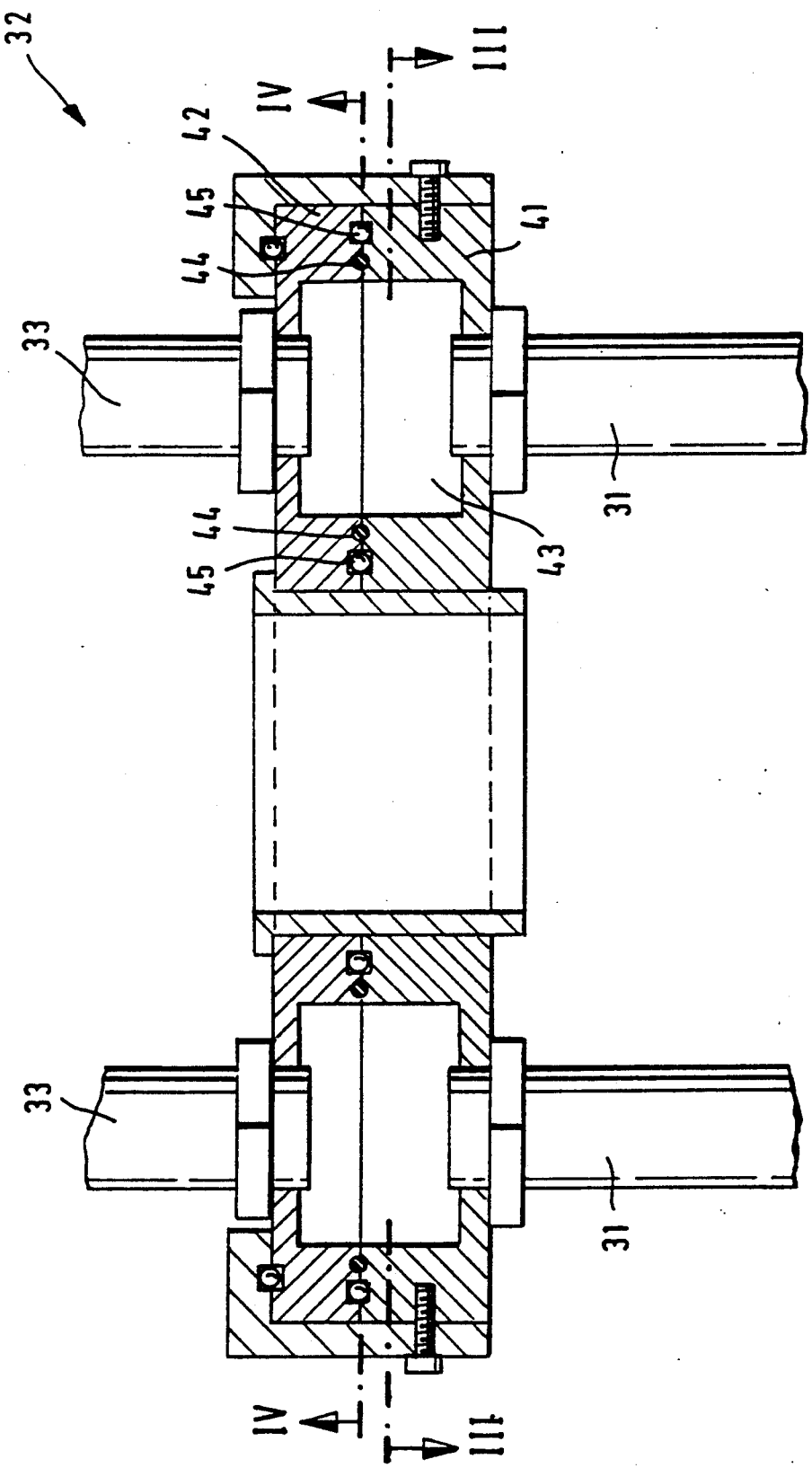
FIG. 2 shows an enlarged view of the gas distributor represented in FIG. 1.
Figure 3:
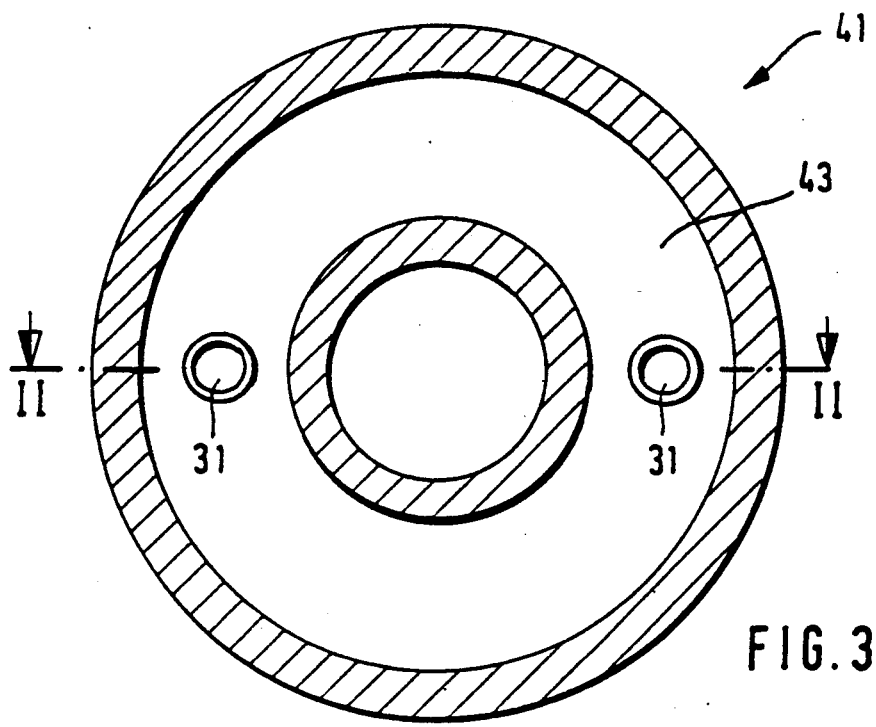
FIG. 3 shows a sectional view taken along the line III—III in FIG. 2.
Figure 4:
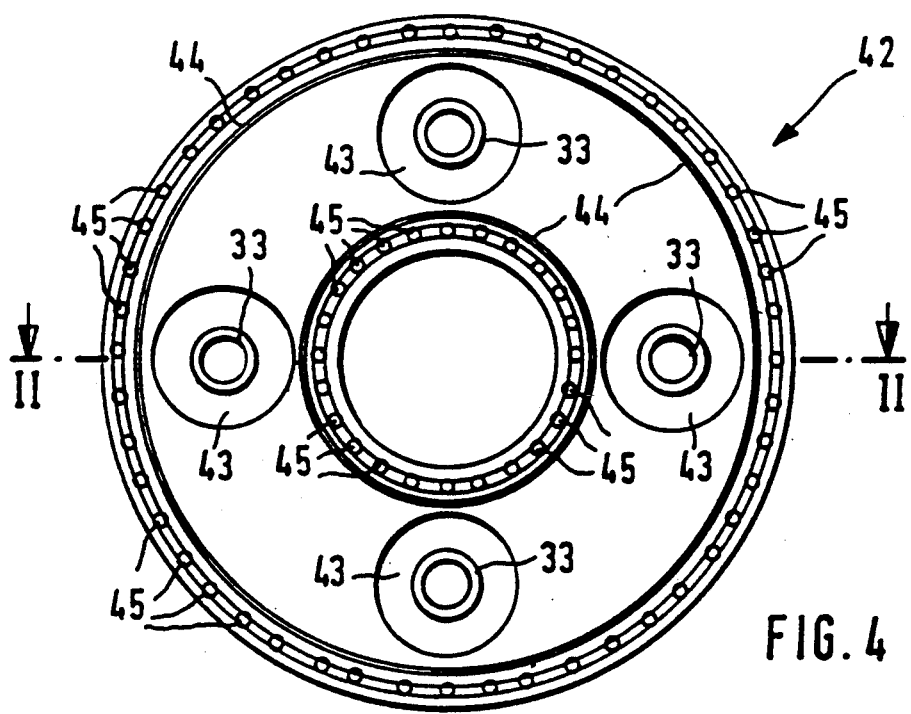
FIG. 4 shows a sectional view taken along line IV—IV in FIG. 2.

In FIG. 2 a gas distributor 32 is shown in an enlarged view. The gas distributor 32 consists of a first distributor disk 41 fixedly arranged at the vehicle and a second distributor disk 42 fixedly arranged at the steering wheel which between them confine a distributor interior 43. There are provided two gas passages 31 and four gas passages 33 as can be seen from FIG. 3 and 4. The compressed gas sources 1, 2 are fixedly arranged at the vehicle outside of the steering wheel 35. The first distributor disk 41 is connected with the steering wheel covering. The gas distributor 32 surrounds the steering column 17 annularly. The partial pressure passages 31 from the compressed gas sources 1, 2 to the first distributor disk 41 partially extend in the steering wheel covering 19. The lower distributor interior 43 belonging to the first distributor disk 41 is of an annular shape (see FIG. 3), the upper distributor interior space 43 belonging to the second distributor disk 42 consists of four annularly shaped partial spaces (see FIG. 4) which lead to one pressure passage 33, respectively. The distributor interior 43 is sealed by sealings 44. The mountings for permitting the relative movement of the first distributor disk 41 and the second distributor disk 42 are designated by the reference numeral 45.

Figure 5:
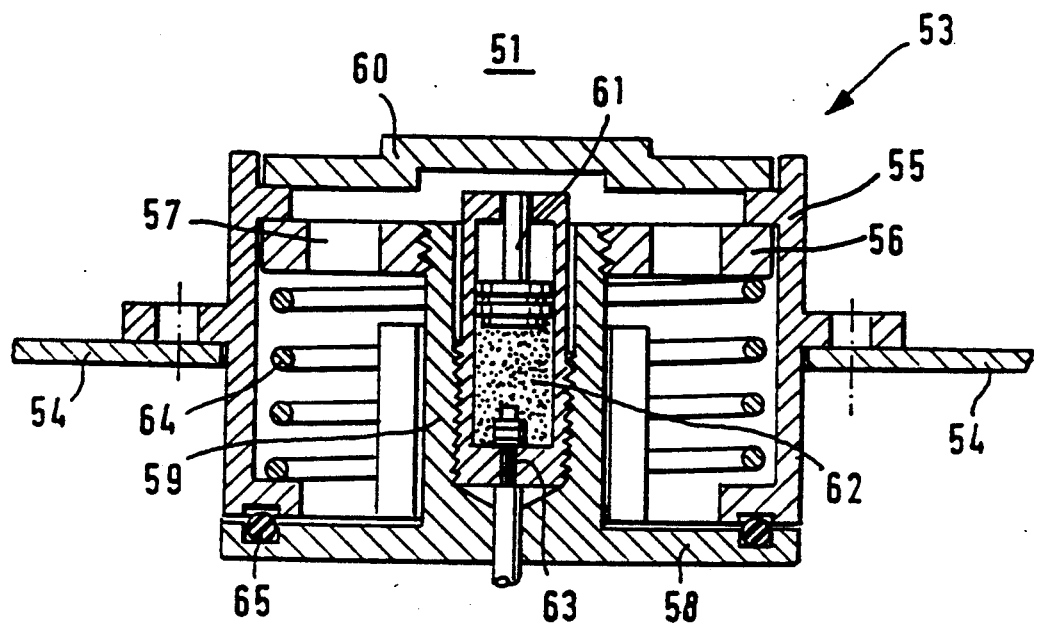
FIG. 5 shows an enlarged view of the outlet valve represented in FIG. 1.
Figure 6:
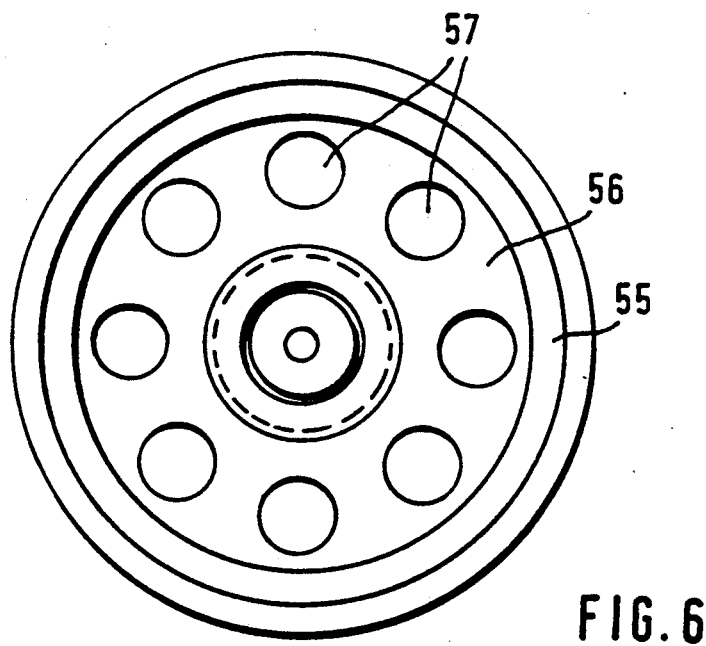
FIG. 6 shows a sectional view through the aperture plate of the outlet valve according to FIG. 5.

Between the air bag interior 51 and the ambience 52 there is arranged an outlet valve 53 which is shown in FIG. 5 in an enlarged view. The outlet valve 53 is stationary and sealingly connected with a plate 54. The plate 54 is arranged fixedly at the steering wheel.

As shown in FIG. 5, the outlet valve 53 has a substantially cylindrical casing 55 in which a plate 56 with apertures 57 is mounted spring-biased and for a longitudinal movement thereof. The apertures 57 are arranged in the aperture plate 56 along an arc of a circle (see FIG.

6). In the casing 55 a valve rocker 59 carrying a valve plate 58 is guided for a longitudinal movement thereof. The outlet valve 53 has a closing plate 60 at its side facing the air bag interior 51, said closing plate 60 being closely and sealingly connected with the casing 55. At first, the closing plate 60 completely seals the air bag interior 51; the outlet valve 53 is not yet activated and therefore ineffective.

30 millisec. after firing of the first compressed gas source 1 and thus 15 millisec after firing the second compressed gas source 2, the closing plate 60 is destroyed. This is carried out by the pin 61 which is propelled upwards by the propellant 62 so that it bursts through and destroys the closing plate 60. Thereby the outlet valve 53 is activated. The propellant 62 can be electrically fired through wires 63.

After the removal of the closing plate 60 and thus after the activation of the outlet valve 53, the pressure in the air bag interior 51 acts on the upper side of the valve plate 58 via the apertures 57. Upon the lower side of the valve plate 58, the ambient pressure is acting. The difference pressure required for the opening of the outlet valve 53 is given by the force of the spring 64. Said spring 64 is supported below at a heel of the casing 55 and above at the aperture plate 56. The aperture plate 56 is fixedly connected with the valve rocker 59. At the upper outer annular surface of the valve plate 58 there is the washer 65 sealing the valve plate 58 with respect to the casing 55. When the difference pressure is large enough, the spring 64 is compressed so that the valve plate 58 is lifted off the casing 55. Then gas can escape out of the air bag interior 51 through the apertures 57 between the casing and the valve plate 58. By the gas outlet valve 53 there is rendered possible a gas displacement in the air bag, if a person is hurled against the air bag. By the escape of gas due to the displacement resulting from the body weight the air bag material can relax and a relatively soft immersion in the air bag is possible. The gas outlet valve is preferably actuated by computer control via a pyrotechnical firing system. It is closed when the gas is supplied to the air bag and is only opened after expiration of 28 to 30 millisec. to relax the material when the body immerses in the air bag. A repeated immersion of the body in the air bag due to an accident is possible without any risk; the support forces are reduced.

Figure 7:
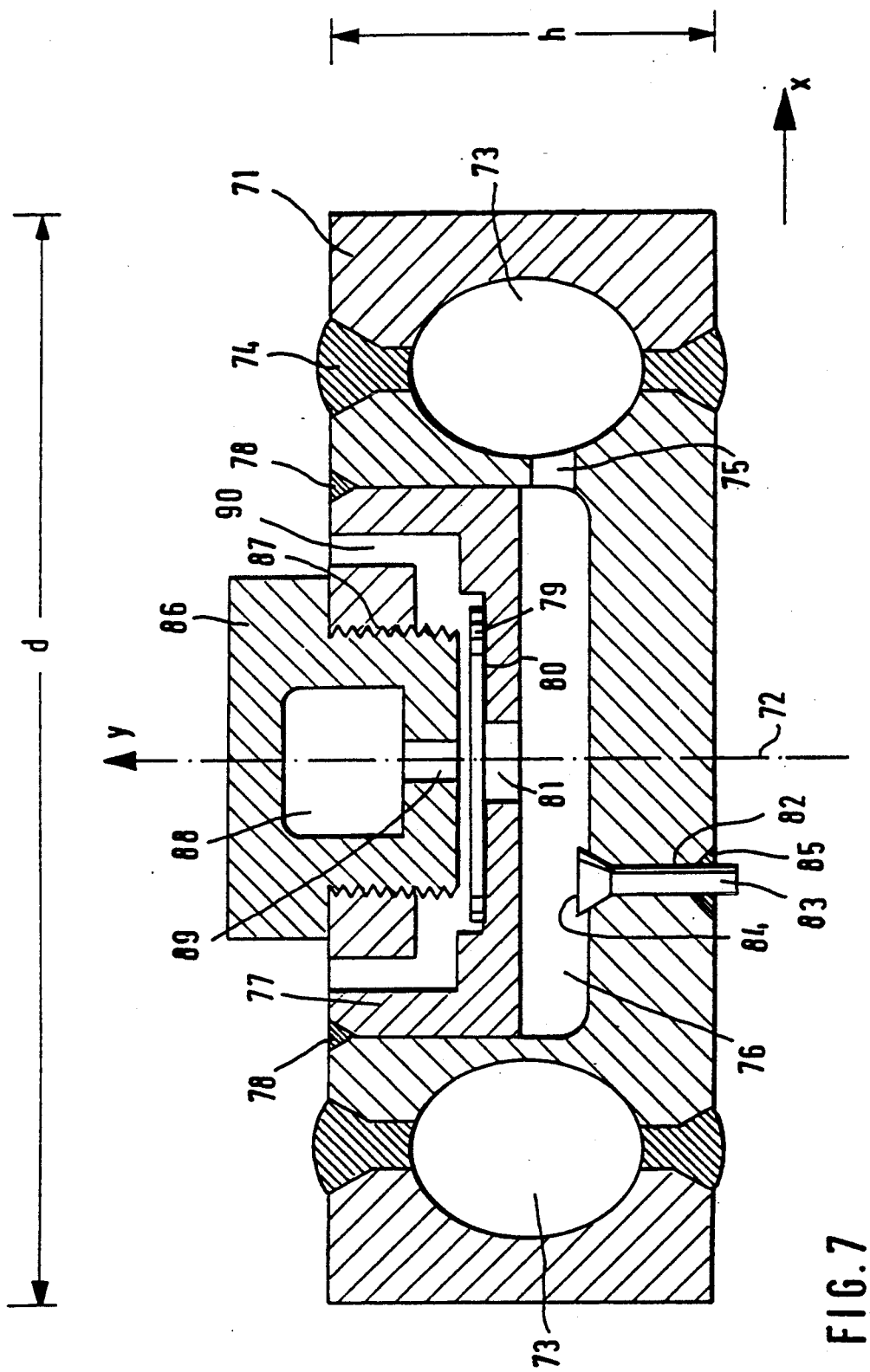
FIG. 7 shows a sectional view of a disk-shaped casing receiving an annularly-shaped compressed gas source.

FIG. 7 shows a cross-section through a disk-shaped casing 71 which is substantially rotationally symmetrical around the axis 72. In the disk-shaped casing there is an annulus 73 which has the form of a torus. The apertures 74 which are conical in the cross-section and circular in the top plan view are completely welded and then grinded at the surfaces of the casing. Prior to the welding the torus-shaped annulus 73 can be produced through the apertures 74. Then said apertures 74 are completely welded and sealed thereby. A radial bore 75 leads to the interior 76 in which there also is compressed gas. In the casing 71 there is a center insert 77 which is welded with the casing 71 through a weld seam 78 being annularly shaped when seen from above. In a center heel of the insert 77 there is a closing plate 79 being welded 80 with the bottom surface of the heel in the insert 77.

From this description it follows that the inner space constituting the compressed gas source and comprising an annulus 73 and an interior space 76 is completely sealed by weldings. Therefore, special sealings are unnecessary. The space occluding the compressed gas is formed by two parts, namely by the casing 71 and the insert 77. The casing 71 and the insert 77 are welded with each other (weld seam 78). Also the apertures are welded: The apertures 74 of the casing 71 are welded, and also the closing plate 79 which covers the opening 81 of the insert 77 is welded to said insert 77 (reference numeral 80). Special sealings are unnecessary.

The casing 71 has a disk shape. Its height h is substantially lower than its diameter d. The cross-section of the annulus 73 is substantially elliptical. The extension of the annulus cross-section is smaller in radial direction x than in the axial direction y. If the pressure in the annulus 73 becomes too large, the casing 71 will fail in the radial direction x and not in the axial direction y. Since the occupant of the vehicle is seated in axial direction of the casing 71, he or she cannot be hit by broken pieces blown off in radial direction.

In the bottom of the housing 71 a bore 82 can be provided which conically extends towards the interior 76. In said bore 82 a locking pin 83 having the same form can be inserted When filling the compressed gas space 73, 76, the pin 83 is substantially hold in the position as shown in FIG. 7. After filling, the pin 83 is retracted, i.e. removed to the outside (in the representation of FIG. 7 downwards). Said movement is supported by the pressure existing within said interior space 76 (for this purpose the locking pin is conically extended; consequently, the end surface 84 is larger than the remaining cross-sectional surface of the locking pin 83). The locking pin 83 can be welded after the complete filling of the compressed gas space 73, 76, as indicated by the reference numeral 85.

A firing housing 86 is arranged in the insert 77. Said firing housing 86 is screw-connected through a thread 87 with the insert 77. In the firing housing 86 there is a hollow space 88 filled with a propellant (not shown in the drawing). The propellant can be fired through electrical connection wires (also not shown in the drawing). Then it propels a pin not shown in the drawing according to FIG. 7 through the bore 89 towards the closing plate (bursting disk) and therethrough. The closing plate 79 is destroyed and causes the compressed gas to be blown into the air bag (not shown in the drawing according to FIG. 7) via the annular path 90.

The embodiment shown in FIG. 7 permits an especially small and space-saving realization of a compressed gas container for an air bag. This is obtained by the fact that the space for the compressed gas is designed as an annulus and is annularly welded at the end surfaces of the disk-shaped casing. In a practical example, 33 normal liters of helium are filled into the volume of a total of 51 cma. The helium has a pressure of 700 bar at a temperature of 20° in the casing or in the compressed gas space. When heating the casing up to 80° C., the pressure is increased to 900 bar. Concerning safety regulations, the casing is designed for a maximum pressure of 1350 to 1400 bar.

We claim:

1. Collision safety device for a vehicle, which comprises:
   a) an air bag inflatable by means of compressed gas;
   b) means for inflating said air bag including at least one compressed gas source, and
   c) outlet valve means communicating the interior of said air bag with the outside atmosphere, said outlet valve means being adapted to be opened and to be closed, said outlet valve means being initially closed and further being adapted to be opened at a predetermined time after said means for inflating said air bag is actuated and if the pressure difference between the interior of said air bag and the outside atmosphere exceeds a predetermined value, said outlet valve means adapted to be closed when said pressure difference between the interior of said air bag and the outside atmosphere no longer exceeds said predetermined value.

2. Collision safety device according to claim 1, wherein said predetermined value is at least about 1 bar.

3. Collision safety device according to claim 2, wherein said predetermined time is at least about 30 milliseconds.

4. Collision safety device according to claim 1, wherein predetermined time is at least about 10 to 15 milliseconds.

5. Collision safety device according to claim 2 wherein said means for inflating said air bag comprises first and second compressed gas sources, said second gas source adapted to be actuated at least about 15 milliseconds after said first compressed gas source is actuated.

6. Collision safety device according to claim 5, wherein said outlet valve means is activated at least about 10 to 15 milliseconds after said second compressed gas source is actuated.

7. Collision safety device according to claim 5, wherein said outlet valve means is activated at least about 30 milliseconds after said first compressed gas source is actuated.

8. Collision safety device according to claim 5, wherein said outlet valve means is activated through a pyrotechnical triggering mechanism.

9. Collision safety device according to claim 8, wherein the outlet valve means comprises a casing in which a valve rocker carrying a valve plate is guided by a valve spring for longitudinal movement thereof.

10. Collision safety device according to claim 9, wherein said outlet valve means is provided with a closing plate at a side facing the interior of said air bag, said closing plate being destructible by a pin which is drivable by a propellant.

11. Collision safety device according to claim 10, wherein said valve rocker is connected to an aperture plate which is guided in said casing for longitudinal movement thereof.

12. Collision safety device according to claim 11, wherein said valve plate is sealingly supported on a lower end of said casing.

13. Collision safety device according to claim 12, wherein said valve spring is arranged between a heel of said casing and said aperture plate as a pressure spring.

14. Collision safety device according to claim 13, wherein each of said first and second compressed gas sources comprises a casing with an annulus.

15. Collision safety device according to claim 14, wherein said annulus is annularly connected on two sides thereof.

16. Collision safety device according to claim 15, wherein a center insert being welded is connected to said casing.

17. Collision safety device according to claim 16, wherein said closing plate is connected to said center insert.

18. Collision safety device according to claim 17, wherein said casing has a disk shaped configuration.

19. Collision safety device according to claim 18, wherein a cross-section of said annulus is smaller in a radial direction than in an axial direction.

20. Collision safety device according to claim 19, wherein said cross-section of said annulus is substantially elliptical in configuration.

21. Collision safety device for a vehicle, which comprises:
a) an air bag inflatable by means of compressed gas;
b) means for inflating said air bag including first and second compressed gas sources, said second gas source adapted to be actuated at least about 15 milliseconds after said first compressed gas source is actuated;
c) outlet valve means communicating the interior of said air bag with the outside atmosphere, said outlet valve means adapted to be opened when said air bag is inflated and the pressure different between the interior of said air bag and the outside atmosphere exceeds a predetermined value, said outlet valve means further being adapted to be activated at least about 10 to 15 milliseconds after said second compressed gas source is actuated.

22. Collision safety device according to claim 21, wherein said outlet valve is activated at least about 15 milliseconds after said second compressed gas source is actuated.

23. Collision safety device according to claim 21, wherein said outlet valve means is activated at least about 30 milliseconds after said first compressed gas source is actuated.

* * * * *